(12) United States Patent
Wygnanski

(10) Patent No.: US 7,252,114 B2
(45) Date of Patent: Aug. 7, 2007

(54) ELECTROMAGNETIC FLUID FLOW CONTROL VALVE

(75) Inventor: Wladyslaw Wygnanski, Cambridge (GB)

(73) Assignee: Camcon Limited, Cambridge (GB)

( * ) Notice: Subject to any disclaimer, the term of this patent is extended or adjusted under 35 U.S.C. 154(b) by 300 days.

(21) Appl. No.: 11/034,580

(22) Filed: Jan. 13, 2005

(65) Prior Publication Data

US 2005/0189021 A1    Sep. 1, 2005

Related U.S. Application Data

(63) Continuation-in-part of application No. 10/449,486, filed on May 30, 2003, now Pat. No. 7,021,603.

(30) Foreign Application Priority Data

May 14, 2004  (GB) ................................. 0410764.5
May 14, 2004  (GB) ..................... PCT/GB04/02080

(51) Int. Cl.
*F16K 31/08*    (2006.01)
(52) U.S. Cl. ............... 137/625.44; 251/65; 251/129.16
(58) Field of Classification Search ........... 137/625.44; 251/65, 129.15, 129.16; 310/15
See application file for complete search history.

(56) References Cited

U.S. PATENT DOCUMENTS 3,589,672 A * 6/1971 Haolloman ............ 251/129.16

| 4,621,660 | A  |   | 11/1986 | Klocke |                |
|-----------|----|---|---------|--------|----------------|
| 6,220,299 | B1 |   | 4/2001  | Arvidsson |              |
| 6,761,439 | B2 | * | 7/2004  | Hoen et al. | ..................... 347/85 |
| 6,848,667 | B1 | * | 2/2005  | Wygnanski | ................... 251/65 |
| 6,935,373 | B2 | * | 8/2005  | Wygnanski | ............. 137/625.44 |

FOREIGN PATENT DOCUMENTS

| DE | 29711175 U1 | 9/1998 |
| GB | 1348671 | 3/1974 |
| GB | 2379726 A | 3/2003 |
| WO | WO-02/04851 A1 | 1/2002 |

* cited by examiner

*Primary Examiner*—Kevin Lee
(74) *Attorney, Agent, or Firm*—Barnes & Thornburg, LLP

(57) ABSTRACT

An electromagnetic actuator status defines two pairs of poles between which an elongate magnetisable armature can see-saw through a mid position between two home positions defined by two of the poles. A closed low reluctance path in each home position includes a permanent magnet which keeps the armature in either home position. An electromagnet is energised by a current pulse, to repel the armature from one home position and attract it to the other. Resilient energy storage means resists the final movement of the armature towards each pole. A non-magnetisable curved central region of the armature makes rolling contact with a complementary curved surface with the stator to cover and uncover openings therein. The stator is housed within, or forms a fluid chamber and fluid supplied thereto can be delivered selectively through one or the other of the two openings.

22 Claims, 3 Drawing Sheets

ELECTROMAGNETIC FLUID FLOW CONTROL VALVE

RELATED APPLICATIONS

This application is a continuation-in-part of U.S. patent application Ser. No. 10/449,486, filed May 30, 2003 now U.S. Pat. No. 7,021,603 and is also a continuation-in-part of International Application No. PCT/GB2004/002080 which claims priority from UK 0410764.5.

FIELD OF INVENTION

This invention concerns electromagnetically operable fluid flow control valve.

BACKGROUND TO THE INVENTION

UK 1,513,966 describes electromagnetic switching devices, FIGS. 10 and 11 of which show such a device in which an armature 3 can rock between two points under the influence of electric current produced changes in the flux linking the armature and four poles 6, 6' 7 and 7'. In FIG. 11 springs are shown permanently linking one end of the armature two of the poles, to centre the armature between the poles. Examples of the centring springs are shown in FIGS. 12 and 13.

In both devices shown in FIGS. 10 and 11 of UK 1,513,966 a layer of non-magnetic material from which the coil bobbin is constructed, exists between the ends of the magnets and the magnetic material forming the poles 6, 6', 7 and 7' respectively. This significantly weakens the flux density available to attract and hold the armature in contact with poles 6 and 7' (or 6' and 7). In fact, unless current is flowing in the solenoid coil of the FIG. 11 device, the armature appears to be held by the centring springs midway between the poles, out of contact therewith. That device is therefore not a truly bistable device, but can adopt an intermediate third state, in which the armature makes no contact with any of the poles. In fact since the springs shown centre the armature in the absence of current in the coil, the forces exerted by the springs on the armature are greater than the force of attraction due to the permanent magnet, and it is only when the magnetic force acting on the armature is increased by the flux due to the current flowing in the coil, that the spring forces are overcome and the armature will move into contact with one or the other set of poles 6 and 7' or 6' and 7.

An electromagnetic actuator is described in U.S. Pat. No. 4,621,660 which employs permanent magnets, a pivoting armature and a winding through which an electric current is passed to shift the armature from one position to another. The armature co-operates with ports and passages in a housing containing the actuator so as to cover and uncover openings therein to control the flow of fluid from one passage to another. However no attempt is made to store energy during armature movement, subsequently to accelerate the armature in transit between its two positions. The actuator does not therefore have a fast response time. In addition the armature will impact against the newpoles as it transfers from one pair of poles to the other, and this can introduce significant wear and shorten the life of the device.

OBJECT OF THE INVENTION

It is an object of the present invention to provide an improved form of integrated electro magnetic actuator and fluid flow control valve.

The invention lies in a fluid flow control valve comprising:

1) a housing defining a chamber to which or from which fluid can flow via a port in the housing wall,
2) an armature adapted to move in a see-saw movement between four poles carried by a stator which define two bistable home positions of the armature, in one of which it makes contact with two of the poles, and in the other of which it makes contact with the other two poles, the armature and poles being located within the housing,
3) at least one permanent magnet,
4) a flux path between pairs of the poles which is completed when the armature is in either of its two home positions, magnetic flux originating from the permanent magnet linking the armature and the two poles with which it is in contact and serving to hold the armature in contact therewith,
5) a curved surface in the middle of the armature which is received in and makes contact with a complementary curved surface between two of the poles, the curved surface on the armature having a radius of curvature which is smaller than that of the other curved surface, so that it rolls with respect to the latter as the armature rocks between its two home positions,
6) at least one opening in the complementary curved surface which is covered by the curved surface on the armature when the latter is in one home position and is uncovered when the armature is in its other home position, to control the flow of fluid therethrough, and
7) spring means creating a force which acts on the armature urging the curved surfaces into contact.

In a valve as aforesaid two springs may be mounted between the armature and either the housing or the stator, one on each side of the armature.

Preferably the spring force acts so as to assist the rolling movement of the armature as soon as it moves out of its mid position towards one or the other of its two home positions.

A second opening may be provided in the complementary curved surface which is covered when the armature occupies its said other home position and is uncovered when the armature occupies its said one home position.

The openings in the complementary carved surface preferably communicate by passage means with second and third ports in the housing wall so that when an opening in the complementary curved surface is uncovered fluid can flow through its passage and related port to or from the chamber.

The port in the housing wall may comprise a fluid inlet to the chamber, in which event the port linked to the or each opening in the complementary curved surface may comprise a fluid outlet.

Preferably the complementary curved surface is formed in the stator, or a member carried by the stator.

In a valve as aforesaid the armature is moveable from one home position to the other by altering the magnetic flux linking the armature and the poles so as to cause the armature to be repelled from the two poles it is in contact with and to be attracted towards the other two poles.

The magnetic flux may be altered by moving a magnet relative to the device, and such a magnet may be a permanent magnet or an energised electromagnet.

Alternatively and more preferably in such a valve the or each permanent magnet is incorporated into the armature and a stationary electromagnet is provided which when energised by a current flowing in one direction alters the magnetic polarity of the poles to effect the changeover of the armature from one home position to the other.

Preferably the or each permanent magnet is incorporated into the flux path between the poles of the stator, and the electromagnet is arranged so as to influence the magnetic polarity of the armature, so that when a current flows in one direction in the winding of the electromagnet, the armature polarity becomes opposite to that which is created by the permanent magnet flux, thereby to cause the armature to be repelled by the poles it is in contact with, and be attracted towards the other two poles.

Preferably energy storing springs are located in two of the poles, each of which is engaged and compressed by the armature as it moves into contact with the pole containing the spring, so that whichever home position the armature occupies one or the other of the two springs is compressed, thereby converting some of the kinetic energy of the armature into potential energy, which is stored in the spring until the armature is released from that home position, when the potential energy is available to accelerate the armature away from that home position towards the other home position.

A the fulcrum may be located at the centre of the complementary curved surface.

The armature curved surface may include a fulcrum and the complementary curved surface may include a depression into which the armature fulcrum protrudes.

Thus a ridge may be provided on the curved surface of the armature and the complementary curved surface may include a groove in which the ridge is received.

Alternatively a ridge may be formed transversely of the said complementary curved surface, and the central region of the curved surface of the armature includes a transverse groove in which the ridge is received.

The engagement between ridge and groove is similar to meshing gear teeth, but preferably the fit is sloppy so as not to interfere with the rolling motion between armature and stator.

The curved armature surface may be part spherical (i.e. part of a sphere) and the complementary curved surface is preferably part cylindrical (i.e. part of a cylinder).

A flow control valve embodying the invention, is essentially bi-stable in that after the permanent magnetic flux is altered to produce the pivoting see-saw action of the armature, the magnetic flux linking the armature and two new poles in the new low reluctance path now established, will be sufficient to cause the armature to remain in that position in contact with those two new poles, and it will remain there until the magnetic flux linking the armature and the poles is altered once again to cause the armature to disengage from those two poles and transfer back to the other two.

The flux alteration may be effected by moving a magnet (which may be a permanent magnet or an electromagnet) into the proximity of the device so as temporarily to alter the permanent magnet flux holding the armature in its one home position, to cause the armature to move to its other home position.

Alternatively the flux alteration may be achieved by causing an electric current to flow albeit momentarily in a winding of an electromagnet which influences the magnetic polarity of the armature or the magnetic polarity of the two poles with which it makes contact in the one home position, to produce a repulsion between the armature and the poles it is in contact with and an attraction towards the other two.

By mounting the pole-pieces defining the poles, permanent magnet, electromagnet (where provided) and armature in a housing, and providing passages in the housing which communicate between inlet and outlet ports in the exterior of the housing and the passage in the or each pole or in a curved surface engaged by a curved surface on the armature for opening and closing same, so an integrated fluid flow control valve and actuator is formed.

The use of resilient energy storing means in such a fluid flow control valve, significantly reduces the reaction time of the armature, (that is the time for the armature to pivot or rock like a see-saw from one home position to the other). It also increases electrical efficiency since energy, derived from the permanent magnet flux, and stored in the resiliently deformable means during the final movement of the armature into contact with the poles, reduces the electric current required to generate sufficient reverse magnetic flux to overcome the residual magnetic retention force acting on the armature, to free the armature and allow it to pivot or rock to its other home position.

When resilient energy storing means is incorporated, the armature will normally achieve its maximum speed at the middle of the changeover from one pole to the other (i.e. midway between a pair of poles defining the two home positions). After passing through the mid position and engaging the resiliently deformable means associated with the other pole a force now acts on the armature which begins to resist onward movement of the armature towards the other pole, so that the instantaneous speed of the armature thereafter is progressively reduced, and some of the kinetic energy of the armature is converted into potential energy and stored in the energy storage means as the latter is resiliently deformed to permit the armature to approach and make contact with the said other pole, and the landing of the armature in its new position in contact with the said other pole can be almost without impact.

Typically each resiliently deformable energy storing means is a vertical spring which is compressed as the armature moves towards and into contact with the pole containing the spring.

Typically the armature is constructed from ferromagnetic material, for example mild steel, and preferably is constructed as a laminated sandwich of thin strips of ferromagnetic material in order to reduce losses caused by eddy currents.

In general the magnetic flux change to cause the armature to move to the other home position needs to oppositely magnetically polarise the armature or the static poles.

A valve embodying the invention has been found not only to have fast response, requiring low driving energy, but more especially a long life span.

BRIEF DESCRIPTION OF THE DRAWINGS

The invention will now be described by way of example with reference to the accompanying drawings, in which.

DETAILED DESCRIPTION OF THE INVENTION

Figures 1, 2:
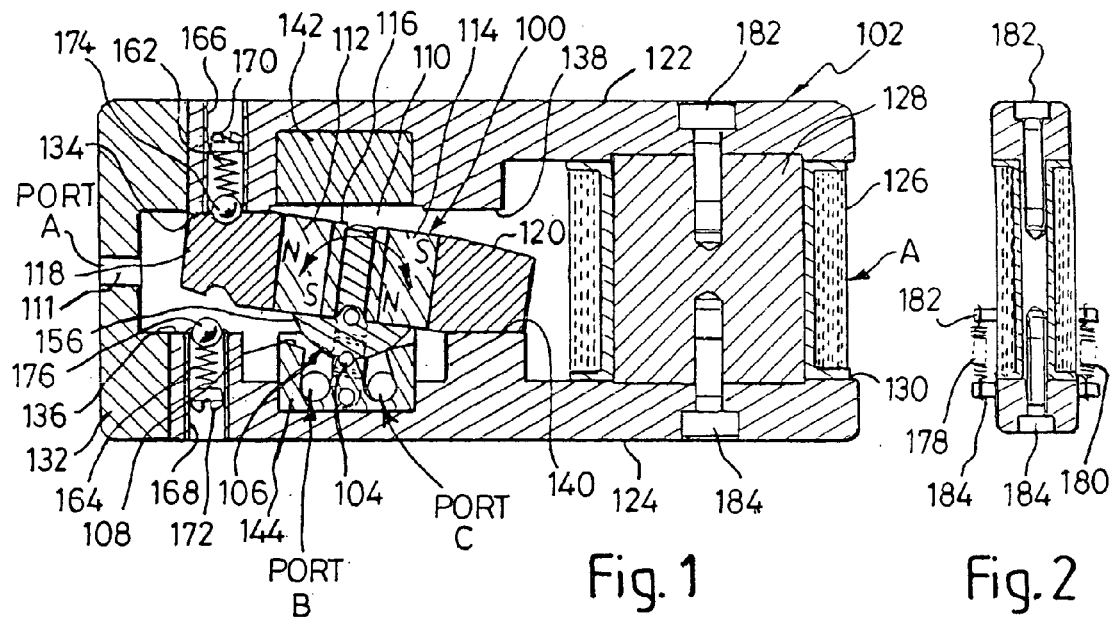
FIG. 1 is a cross sectional side view of an integrated valve and magnetic actuator constructed as an embodiment of the invention for controlling the flow of fluid between inlet and outlet ports.
FIG. 2 is an end view of the device of FIG. 1, taken in the direction of arrow A.

Valves constructed substantially as shown in the drawings have achieved some billions of complete cycles without any perceived wear and without interruption. This success is attributed to the soft landings of the armature on the respective poles due to the conversion of kinetic energy into potential energy as the armature moves through and beyond its mid-position and the spring effect that has been accelerating the armature away from one pole towards the other through its mid-position, reverses and begins to decelerate the armature as it leaves the mid-position and starts to move towards the other pole.

By careful selection of magnetic force and spring force, so the arrival of the armature on each pole at the end of its travel from one to the other can be virtually without impact.

Furthermore, by careful selection of spring material so that the distortion of the resilient material providing the spring force is well within its elastic limits, the material, is not unduly stressed in operation so that fatigue will not be a factor in the life of the resilient material forming the spring.

In FIGS. 1 and 2 an armature generally designated 100 is mounted within a housing generally designated 102 to rock about a fulcrum 104, like a see-saw, between two home positions. The armature 100 is shown in one of its two home positions in FIG. 7 and in that position a curved underside central region 106 of the armature completely covers an opening in a valve seating surface 108 leading to a port C, leaving a similar opening on the other side of the fulcrum 104 exposed. This other opening leads to a port B.

The housing 102 is closed so as to form a fluid tight chamber 110, to which fluid can be supplied (or from which it can be removed) via an opening 111 in the wall thereof, which leads to a port A.

In the other home position, the armature 100 uncovers the opening leading to port C and closes off the opening leading to port B.

Depending on which home position is occupied by the armature, so fluid can flow between A and B, or A and C, or vice versa.

The armature is comprised of two permanent magnets 112, 114 sandwiched between three pieces of ferromagnetic material which form a central bridge 116, and two ends 118, 120 beyond the magnets.

The housing is comprised of upper and lower elongate ferromagnetic members 122, 124 between which is sandwiched at one end a coil 126 having a ferromagnetic core 128 and non-magnetic (typically plastics) bobbin 130.

At its other end the members are joined by an end closure 132 of non-magnetic material, and between the coil and end closure each of the members 122, 124 is formed internally with two similar protrusions, forming two pairs of magnetic poles 134, 136 on one side, and 138, 140 on the other side, of the fulcrum 104.

In its home positions the armature engages one from each of the two pairs of poles, i.e. 134 and 140 (as shown) or 136 and 138 in its other home position.

In order to obtain good face to face contact, the armature ends 118, 120 are tapered (as shown in FIG. 1). Alternatively the internal ends of the poles 134, 136, 138 and 140 may be inclined to allow parallel faced ends 118, 120 to fit face to face therewith.

The upper and lower members 122, 124 are cut away internally between the poles 134, 138 and 136, 140 to provide two rectilinear recesses into which two blocks of non-magnetic material 142, 144 are located and secured, as by an adhesive or by rivets or bolts (not shown). The poles 134-140 protrude internally beyond the internal faces of the blocks 142, 144 so that the latter do not interfere with the rocking of the armature from one set of poles to the other. In fact a clear space exists at all times between 142 and the armature.

Below the armature the internal face of block 144 is dished to form the curved surface 108. Centrally of the surface is a wear resistant pin 146 (see FIG. 5) which protrudes above the surface 108 to provide a fulcrum about which the armature 100 can rock.

Figure 5:
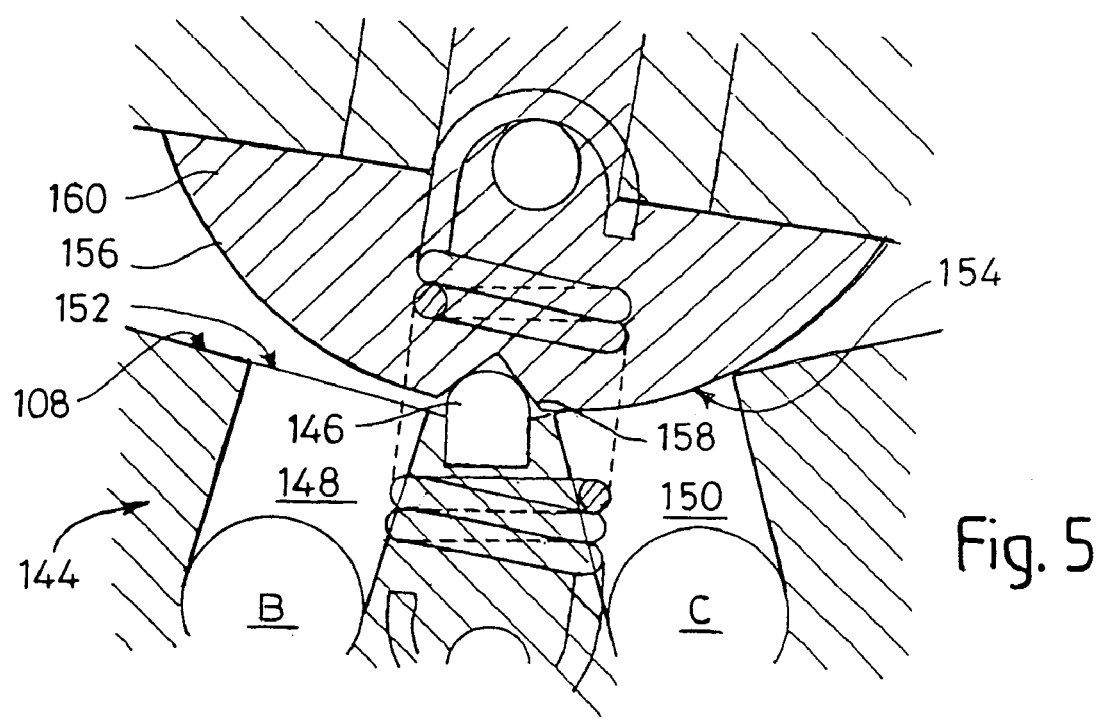
FIG. 5 is an enlarged view of the central rolling element forming part of the armature of the device of FIGS. 1 and 2.

Also visible in FIG. 5 are passages 148, 150 leading from the ports B and C to the openings in the valve seating 108, denoted by 152 and 154 respectively in FIG. 5.

The armature 100 comprises a valve closure in that its movement into its two home positions closes either 152 or 154. In order to provide a rolling action to achieve closure, the central underside of the armature is formed with a curved underside 156 (see both FIGS. 1 and 5) having a central cavity 158 in which the head of the pin 146 is received.

Where the pin 146 is circular in cross-section and has a domed upper end, the cavity is preferably conical or frusto-conical.

Where the pin 146 is rectangular in cross-section, and forms a semi-cylindrical or triangular profile ridge about which the underside 156 rocks, the cavity 158 should be a triangular section groove for accommodating the curved or triangular section of the ridge.

The curved underside 156 may be an integral formation at the lower end of the central bridge section 116 of the armature, but more conveniently comprises a separate non-magnetic element 160 which is secured to the underside of the bridge section 116 in any convenient manner, and is preferably constructed from hard wearing material which may be similar to that from which the fulcrum pin 146 is constructed, Typically 146 and 160 are constructed form a Nylon® or similar plastics material.

In theory rocking can be achieved even if the two surfaces have the same radius of curvature but it has been found preferable for the radius of curvature of the curved surface 156 to be less than that of the curved surface 108. This is clearly shown in FIG. 5.

In order to ensure a good closing action as the curved surface 156 moves to cover openings 152 or 154, it has been found advantageous for the surface 156 to be part spherical (rather than cylindrical) and for the curved surface 108 to present a part cylindrical surface to the curved underside 156 of element 160.

Although the block 144 is preferably non-magnetic, it may still be formed from a material whose surface hardness is greater than the surface hardness of the material forming element 160. Thus block 144 (or at least the surface 108 thereof) may be formed from a non-magnetic metal and element 160 (or at least the surface 156) from a plastics material which can be considered to be resiliently deformable in relation to a metal. By employing such a combination of materials, the underside surface 156 of element 160 can if necessary deform slightly to ensure a good seal around the opening 152 or 154 as the armature rocks into contact with one set of poles or the other, thereby ensuring a reliable closure of the opening 152 or 154 leading to port B or C.

As shown the valve will direct fluid flow from A to B or to C, (or permit fluid to flow through B or C, and to leave via A).

If the valve is merely to serve as an ON/OFF valve so as to permit or interrupt fluid flow between for example A and B, it is merely necessary to block off port C. Alternatively by blocking off B, fluid flow is between A and C.

If fluid flow is from A to B (or C) in an ON/OFF configuration of the valve, then the pressure of the fluid in the chamber 110 (see FIG. 1) will tend to assist in keeping the armature in the home position of the armature which is interrupting flow.

In order to reduce the impact as the armature rocks from one position to the other, springs 162, 164 are provided in passages 166, 168 in the pole pieces 134, 136 respectively. The springs are held captive between closures 170, 172 and balls 174, 176. The latter are held captive by a reduced diameter neck at the inboard end of each passage 166, 168 which permits the balls to protrude beyond the inner faces of the poles 134, 136 but prevent them from leaving the passages completely.

The springs may be compressed by adjusting the position of the closures 170, 172. To this end the passages 166, 168 are formed with an internal screw thread and the closures 170, 172 are formed with a complementary external screw thread and a screwdriver slot is formed in their outward facing ends. By inserting a screwdriver blade in the slot, a closure can be turned so as to move further into, or in a direction out of, the passage, so as to compress its spring to a greater or lesser extent.

As the armature rocks into the position shown in FIG. 1, the ball 174 is engaged by the armature end 118 and will be urged inwardly, thereby compressing (or further compressing) the spring 162, until the armature end engages the inner face of 134.

In doing so, energy is stored in the spring 162 which is available to help accelerate the armature in an opposite sense, when it is induced to rock towards its other home position.

The permanent magnets 112, 114 are selected so as to provide sufficient magnetic flux when the armature is in either of the two home positions to retain the armature in the last position to which it has moved, and to more than overcome any spring force in the compressed spring 162 (or 164) in the pole 134 (or 136) to which it has moved. This is achieved by virtue of the closed magnetic path formed by the armature, the two poles it contacts 134, 140 (or 136, 138), the members 122, 124 and the coil core 128.

Movement of the armature from one position to the other is achieved by introducing magnetic flux in opposition to that established by the magnets 112, 114 so as to cause the armature ends to be repelled from the poles with which they are in contact (e.g. 134, 140) and to be attracted to the other two poles (136, 138).

This can be achieved by moving a powerful permanent magnet near to the device (in which event the coil 126 is not required), but more preferably by causing an electric current to flow through the coil 126 in a direction to create magnetic flux in opposition to that due to the magnets 112, 114. However it is only necessary for the current to flow for the time required for the armature to rock from one set of poles to the other—and with the accelerating effect of the springs 162, 164 this can be a very short period of time.

Clearly the effect of the compressed spring 162 (or 164) acting on the armature will tend to reduce the force exerted by the latter on the surface 108 around the opening 152 (or 154) and which is closed off by the armature in that position.

To counteract this, and further assist the movement of the armature from one home position to the other, the armature may be acted on by a stretched spring which is further extended as the armature moves through its mid position between one home position and the other. This creates a top dead centre position of the armature in which it is momentarily in unstable equilibrium. However as soon as the armature moves beyond this point, the spring begins to exert a turning moment on the armature, tending to move it in the direction it is already moving in, towards the new home position, and will also assist in holding the armature in that position when reached.

Figure 4:
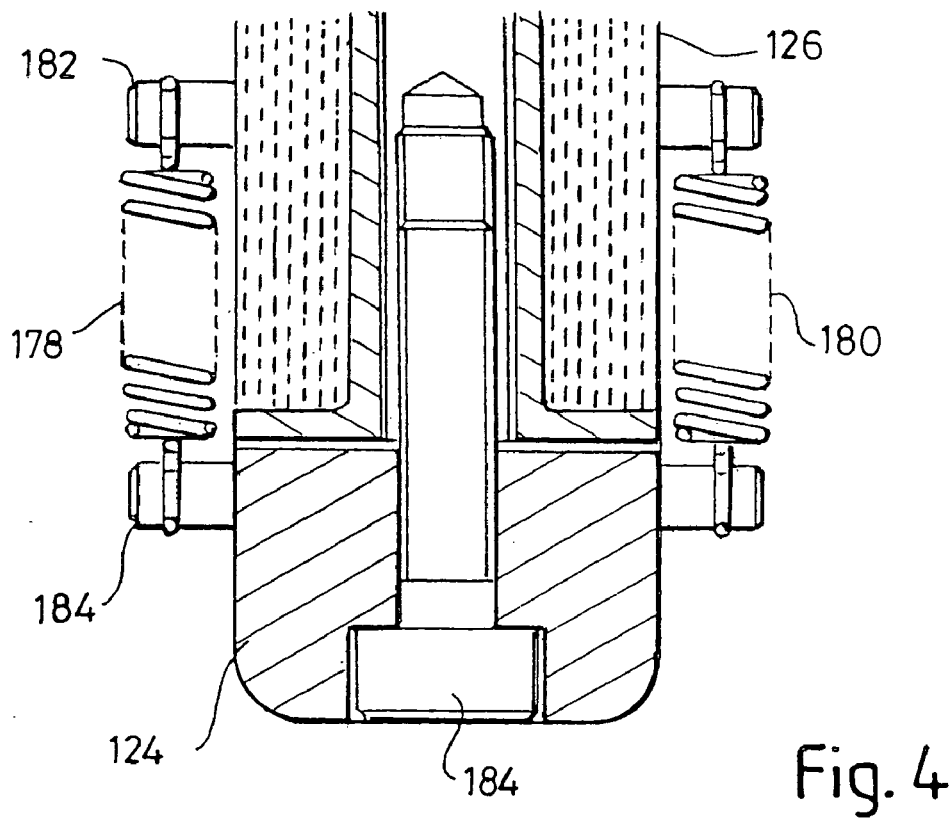
FIG. 4 is a scrap section to an enlarged scale of the lower end of the device shown in FIGS. 1 and 2.

Preferably two such springs 178, 180 are provided one on each side of the armature as can be seen in FIGS. 2 and 4. The springs are fitted between two pins 182, 184, one of which protrudes laterally through the bridge section 116 of the armature and the other through the block 144 (or the magnetic member 124).

The spring force exerted by the springs 178, 180 on the armature will of course tend to resist subsequent movement of the armature away from its home position. However this will be partly compensated by the accelerating force of the relevant spring 162 or 164, and may merely require a slightly larger current to flow in the winding 126 to cause the armature to begin to rock towards its other home position. Once beyond the top dead centre (mid-way) position, the effect of the springs 178, 180 will be to assist in closing the valve.

The core 128 is conveniently secured to the upper and lower members 122, 124 by bolts 182, 184 which can be seen in FIGS. 1, 2 and 4.

It has been found that the spring assisted rolling action of the surface 156 into contact with one or other of the openings 152, 154 (see FIG. 5) tends to crush or shift any solids in a fluid which is being controlled by the valve. This allows the valve to be used with unfiltered liquids or air or gases containing particles of dust or sand or the like.

Figure 3:
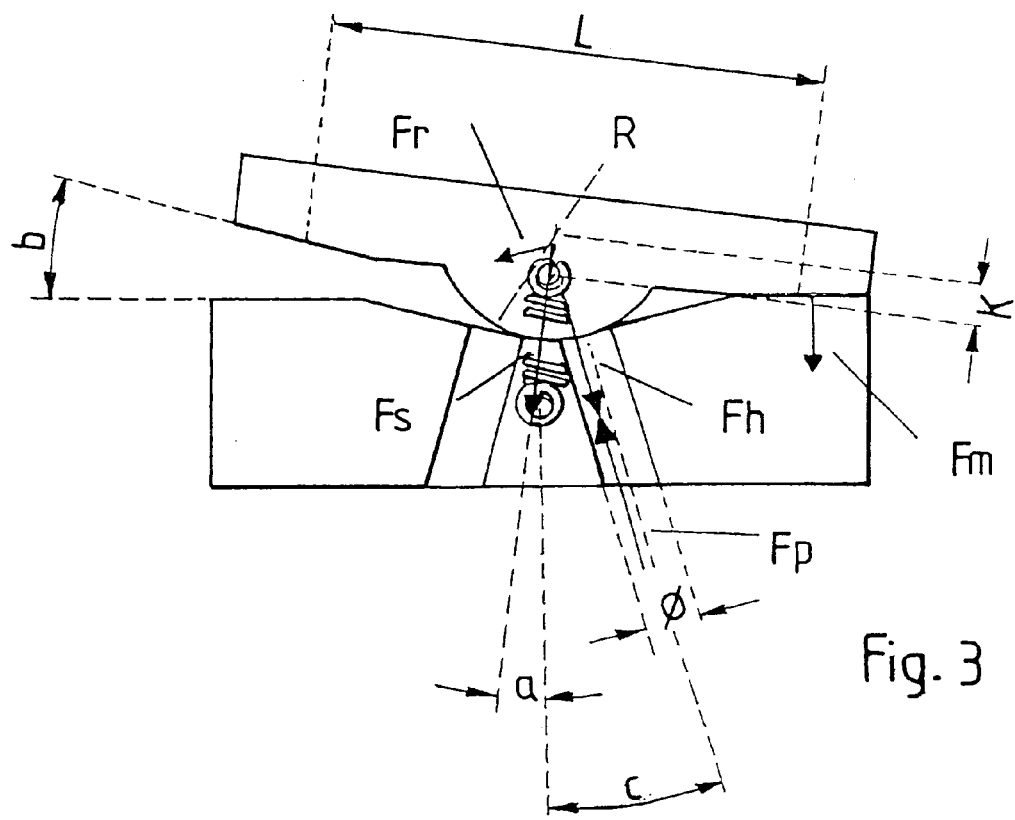
FIG. 3 is a diagrammatic view of the armature and valve seating arrangement of FIG. 1 to an enlarged scale.

FIG. 3 illustrates the forces acting on the armature and other components, where the forces, pressures, diameters, lengths and angles are denoted as follows:

P [bar]—pressure difference at inlet
Φ [mm]—orifice diameter
R [mm]—rolling sphere radius
K [mm]—spring fitting offset
L [mm]—swing bar effective length
a [deg.]—spring declination angle
b [deg.]—swing bar angular stroke
c [deg.]—pivoting force projection angle
Fp [N]—pressure force
Fh [N]—holding force
Fs [N]—spring force
Fr [N]—rotating force
Fm [N]—magnetic force
Ms [Nm]—reversing momentum caused by spring force
Mp [Nm]—reversing momentum caused by pressure
Mr [Nm]—effective reversing momentum
Mh [Nm]—holding momentum The following formulae can be used to compute forces and moments, namely:

$$Fp = \Pi \Phi^2 P/4$$

$$\Delta F = Fh - Fp$$

$$Fs = Fh/\cos a$$

$$Fr = Fh \, tg \, a$$

$$Ms = Fr(R-K)\cos c$$

$$Mp = \Delta F \, \Phi/2$$

$$Mr = Ms + Mp$$

$$Mh = Fm\ L$$

$$Fm = Mh/L$$

If the following conditions can be assumed to obtain, namely:

P=60 [bar] (900 psi)
Φ=6 [mm]
R=13 [mm]
K=5 [mm]
L=56 [mm]
a=7.5 [deg.]
b=15.0 [deg.]
c=13.2 [deg.]

then pressure force Fp is given by:

$$Fp = \pi 6^2 60/40$$
$$= 169\ N$$

In order to maintain the valve in a closed state Fh must be greater than Fp.

If a safety margin of 30% is required, then if Fp=169N, Fh must be 220N.

If Fh=220 N then:

$$\Delta F = 220 - 169 = 51\ N$$

$$Fs = 220/\cos 7.5 = 222N$$

$$Fr = 220\ \text{tg}\ 7.5 = 29N$$

$$Ms = 29(13-5)\cos 13.2/10^3 = 0.226Nm$$

$$Mp = 51\ 6/2\ 10^3 = 0.153Nm$$

$$Mr = 0.226 + 0153 = 0.379Nm$$

In order to maintain a stable magnetically locked condition, Mh must be greater than Mr. Again, if a 30% safety margin is required, Mh needs to be 0.5 Nm.

From the formulae above, it can be calculated that the magnetic force needs to be 8.9N.

It is quite feasible to attain a magnetic force of this magnitude (which is just less than 1 Kg), since it is possible to obtain a magnetic force of 20N using a rectilinear magnet of 10 mm×10 mm cross section and 20 mm length.

It is to be noted that two magnets such as 112, 114 are not essential, and a single magnet can be employed in their place if desired. Thus the bridge 116 and the two magnets 112, 114 may be replaced by a single magnet.

Alternatively magnets may be omitted from the armature altogether and one or more may be located in the magnetic circuit formed by 122, 128 and 124. Thus for example the core 128 of the electromagnet may be a permanent magnet. It is merely necessary that the permanent magnet(s) cause poles 134 and 138 to have the same magnetic polarity, opposite to that of poles 135 and 140.

Figure 6:
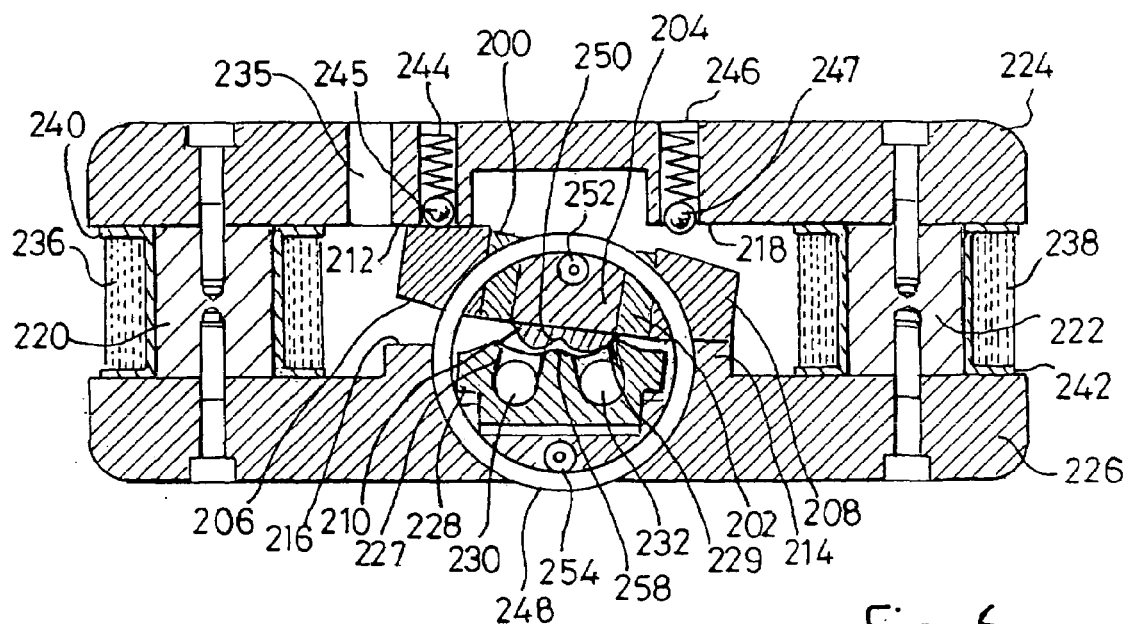
FIG. 6 is a side elevation view of another embodiment of the invention, similar to that shown in FIGS. 1-5.

In FIG. 6 an armature comprises two similar permanent magnets 200, 202, symmetrically arranged between opposite ends of a central magnetisable region 204, and magnetisable end pieces 206, 208. The armature includes a bearing member 210, typically of non-magnetic material which has a curved underside hardened bearing surface and is fitted to the central region 204 midway between the two ends 206, 208.

The armature is mounted within a symmetrical stator assembly of magnetisable material defining four symmetrical poles 212, 214, 216 and 218, and two electromagnet cores 220, 222. Upper and lower parts 224, 226 join the ends of the cores 220, 222 and internal faces thereof define four poles 212, 214, 216 and 218.

Between the poles 216 and 214 is located a second bearing member 228 also of non-magnetisable material having an upper complementary curved and hardened surface on which the hardened curved surface of bearing member 210 will roll. To facilitate this, the radius of curvature of the curved surface of 228 is greater than the radius of curvature of the curved surface 210.

The openings in the bearing member 228 are covered and uncovered by the rolling action of the bearing member 210, basically as described with reference to FIGS. 1-5.

Figure 7:
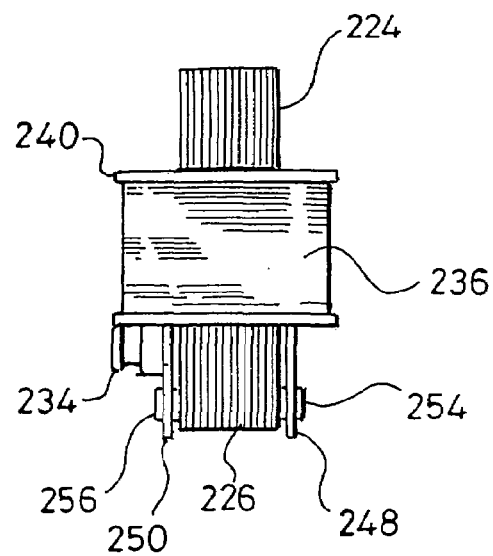
FIG. 7 is an end view of the device shown in FIG. 6.

The two openings which communicate with two passages 227, 229 which in turn communicate with two perpendicular passages 230, 232 which lead to external lateral fluid ports one of which is shown at 234 in FIG. 7. In the position shown, the curved surface of 210 has closed the opening leading to passage 229 and port 232, but the other is open.

The stator comprises, or is mounted within, a fluid tight housing and a port 235 (see FIG. 6) communicates with the central region of the stator/housing.

Where stator is contained within a housing, or forms part of a housing, flow of fluid to and from the interior of the housing (i.e., the central region of the stator) can be controlled by the rocking of the armature.

Two electromagnet windings 236, 238 on formers 240, 242 are located around the cores 220, 222 respectively.

Springs 244, 246 acting on captive balls 245, 247 provide resistance to final movement into contact between armature and poles, again as described with reference to FIGS. 1-5.

The armature and stator bearing surfaces are resiliently biased into contact by two space saving ring springs 248, 250 which are a spring-fit over two pairs of pins protruding on opposite sides of the armature and stator assembly. One pair is shown in FIG. 6 at 252 and 254, and the lower one of the other pair is visible in FIG. 7 at 256. The use of such springs reduces the overall width of the device—which may then be dictated by the width of the windings 236, 238. There may be smaller than as shown in FIG. 7.

More particularly such springs do not trap dirt or dust which can affect the operation of coiled springs (such as are shown in FIGS. 1-5) and provide reduced flow resistance as compared to coiled springs.

A ridge 258 midway between the openings in the curved surface of 228 (leading to the parts 230, 232) is a sloppy fit in a groove 260 in the centre of the curved underside surface of bearing member 210. This stabilises the movement of the armature and prevents skidding of one surface relative to the other. The ridge is a sloppy fit in the groove so as not to impede rolling motion.

It is a feature of the device shown in FIGS. 1-7 that the curved surfaces of the bearing members 210, 228 may be hardened or instead, or in addition, may be plated or otherwise coated with wear and/or erosion resistant material.

In addition, where the fluid flow rate is high, the flow itself can damage valve and passage surfaces, and to this end all surfaces in contact with the fluid are preferably hardened or. coated or plated as aforesaid.

A valve such as shown in FIG. 1-7, but especially as shown in FIGS. 6 and 7, is suitable for working "down hole" in an oil well, or in an oil well drilling operation, since it requires very little power to operate, and in any case the power is only required momentarily.

The invention claimed is:

1. A fluid flow valve comprising:
   1) a housing having a wall which defines a chamber,
   2) an opening in the housing wall,
   3) a magnetisable stator,
   4) an armature adapted to move in a see-saw manner relative to the stator within the chamber,
   5) the stator having four magnetic poles which define two bistable home positions of the armature, such that in one home position the armature makes contact with two of the poles, and in the other home position the armature makes contact with the other two poles,
   6) at least one permanent magnet,
   7) a flux path between pairs of the poles which is completed when the armature is in either of its two home positions, magnetic flux originating from the permanent magnet linking the armature and the two poles with which the armature is in contact and serving to hold the armature in contact therewith,
   8) a curved surface in the middle of the armature,
   9) a complementary curved surface between two of the poles within which the armature curved surfaced is received, the curved surface on the armature having a radius of curvature which is smaller than that of the complementary curved surface, so that the armature can roll within the latter as the armature moves between its two home positions,
   10) at least one opening in the complementary curved surface which is covered by the curved surface on the armature when in the one home position and is uncovered when in the other home position, to control the flow of fluid therethrough, and
   11) spring means which acts on the armature and creates a force urging the curved surfaces into contact.

2. A valve as claimed in claim 1 wherein the spring means acts between a central region of the armature and the stator to keep the two curved surfaces in rolling contact.

3. A valve as claimed in claim 1 wherein the spring means acts to create a position of unstable equilibrium when the armature is midway between the magnetic poles.

4. A valve as claimed in claim 1 wherein the spring means comprises at least one helical spring in tension between a lateral protrusion on the armature and a lateral protrusion on the stator.

5. A valve as claimed in claim 2 wherein the spring means comprises at least one spring steel ring engaged between lateral protrusions from the armature and the stator.

6. A valve as claimed in claim 1 wherein two springs are mounted between the armature and the housing, one on each side of the armature.

7. A valve as claimed in claim 1 wherein the spring means acts between a central region of the armature and the stator on each side of the armature.

8. A valve as claimed in claim 1 wherein the spring force acts so as to assist the rolling movement of the armature as soon as it moves out of its mid position towards one or the other of its two home positions.

9. A valve as claimed in claim 1 wherein a second opening is provided in the complementary curved surface which is covered when the armature occupies the other home position and is uncovered when the armature occupies said one home position.

10. A valve as claimed in claim 1 wherein the armature is moveable from one home position to the other by altering the magnetic flux linking the armature and the poles so as to cause the armature to be repelled from the two poles it is in contact with and to be attracted towards the other two poles.

11. A valve as claimed in claim 10 further comprising a magnet movable relative to the armature to alter the magnetic flux and cause the armature to move.

12. A valve as claimed in claim 11 wherein the magnet is a permanent magnet.

13. A valve as claimed in claim 11 wherein the magnet is an energized electromagnet.

14. A valve as claimed in claim 1 wherein the permanent magnet is incorporated into the armature and further comprising a stationary electromagnet which when energized by a current flowing in one direction alters the magnetic polarity of the poles to effect the changeover of the armature from one home position to the other.

15. A valve as claimed in claim 1 wherein the permanent magnet is incorporated into the flux path between the poles of the stator, and the electromagnet is arranged so as to influence the magnetic polarity of the armature, so that when a current flows in one direction in the winding of the electromagnet, the armature polarity becomes opposite to that which is created by the permanent magnet flux, thereby to cause the armature to be repelled by the poles it is in contact with, and be attracted towards the other two poles.

16. A valve as claimed in claim 1 further comprising energy storing springs which are located in two of the poles at one end of the armature, each of which is engaged and compressed by the armature as the latter moves towards and into contact with the pole, so that whichever home position the armature occupies one or the other of the two springs is compressed, thereby converting some of the kinetic energy of the armature is released from that home position, when the potential energy is available to accelerate the armature away from that home position towards the other home position.

17. A valve as claimed in claim 1 further comprising a ridge on the curved surface of the armature and a groove in the complementary curved surface in which the ridge is received.

18. A valve as claimed in claim 1 further comprising a ridge formed transversely of the complementary curved surface, and groove formed transversely of a central region of the curved surface of the armature, in which the ridge is received.

19. A valve as claimed in claim 1 wherein the curved armature surface is part spherical and the complementary curved surface is part cylindrical.

20. A valve as claimed in claim 1 wherein the opening in the housing wall comprises a fluid inlet to the chamber and opening in the complementary curved surface comprises a fluid outlet.

21. A valve as claimed in claim 1 wherein the complementary curved surface is formed in the stator.

22. A valve as claimed in claim 1 wherein the armature is constructed from ferronmagnetic material.

* * * * *